United States Patent [19]

Fisher

[11] Patent Number: 5,106,342
[45] Date of Patent: Apr. 21, 1992

[54] HOOKES UNIVERSAL JOINTS

[75] Inventor: Leslie G. Fisher, Streetly, England

[73] Assignee: GKN Cardantec International Gesellschaft fur Antriestechnik mbH, Essen, Fed. Rep. of Germany

[21] Appl. No.: 488,069

[22] PCT Filed: Dec. 29, 1988

[86] PCT No.: PCT/GB88/01119
§ 371 Date: Jun. 20, 1990
§ 102(e) Date: Jun. 20, 1990

[87] PCT Pub. No.: WO89/06324
PCT Pub. Date: Jul. 13, 1989

[30] Foreign Application Priority Data

Jan. 6, 1988 [GB] United Kingdom ............... 8800196

[51] Int. Cl.$^5$ ............... F16D 3/205; F16D 3/41; F16C 21/00
[52] U.S. Cl. ................... 464/132; 384/126; 384/425
[58] Field of Search ............ 464/11, 14, 128, 129, 464/131, 132; 384/126, 127, 425, 427, 452, 454, 455, 548, 564, 569

[56] References Cited

U.S. PATENT DOCUMENTS

| 3,950,834 | 4/1976 | Pitner .................. 464/128 X |
| 4,130,325 | 12/1978 | Schultenkamper ............ 384/425 |
| 4,512,672 | 4/1984 | Olschewski et al. ......... 464/131 X |
| 4,611,932 | 9/1986 | Olschewski et al. ......... 464/131 X |
| 4,637,740 | 1/1987 | Olschewski et al. ......... 464/128 X |

FOREIGN PATENT DOCUMENTS

| 3115659 | 11/1982 | Fed. Rep. of Germany ...... 464/128 |
| 902865 | 8/1962 | United Kingdom . |
| 2199089A | 6/1988 | United Kingdom . |

Primary Examiner—Daniel P. Stodola
Assistant Examiner—William G. Battista, Jr.
Attorney, Agent, or Firm—Marshall, O'Toole, Gerstein, Murray & Bicknell

[57] ABSTRACT

A thrust washer for a bearing assembly of a Hookes universal joint, comprising a central portion (10) and a peripheral portion (13), connected by at least one web which permits the two portions to be displaced axially of the bearing assembly relative to one another as the joint is assembled so that with a peripheral portion of greater thickness than the central portion, the thrust washer can be used in place of a conventional thrust washer with a peripheral flange without requiring careful placing of the washer in the bearing cup in a particular orientation during assembly since either side or face of the washer can be inserted first in the bearing cup.

25 Claims, 1 Drawing Sheet

HOOKES UNIVERSAL JOINTS

This invention relates generally to Hookes universal joints. A Hookes universal joint, for torque transmission between two shafts or other rotary elements which are required to articulate relative to one another, comprises two yoke members connected respectively to the rotary elements, joined by a cross member having journals supported in the yoke members. In the type of Hookes joint with which the present invention is concerned each journal is supported in a bearing cup held by a yoke part, with needle roller bearings disposed between the circumferential surface of the journal and the circumferential (side) wall of the bearing cup. Such a Hookes joint will hereafter be referred to as a Hookes joint of the type specified.

In such joints, it is usual to provide each bearing cup with a thrust washer disposed between the base wall of the bearing cup and the end surface of the journal received therein. Such a thrust washer is necessary to accommodate forces and prevent any free play from arising along the axis of the journal, i.e. transversely of the joint as a whole. It is usual also for the thrust washer to have a peripheral portion which abuts the ends of the needle roller bearings rather than the end surface of the journal, so that the needle roller bearings occupy a predetermined position in the bearing cup, in the direction axially of the journal. In particular, since the end of the journal usually is formed with a frusto-conical bevelling between its circumferential surface and end surface, the peripheral portion of the thrust washer ensures that the needle roller bearings do not run against such bevelling in use.

Therefore a typical form for the thrust washer has been that of a disc of suitable plastics material, with a central portion and a peripheral portion, of greater thickness than the central portion, in the form of a raised circumferential lip or flange for engaging the ends of the needle roller bearings. However, such a thrust washer has to be carefully inserted into the bearing cup during assembly of the joint, to ensure that its lip or flange extends in the correct direction to engage the needle roller bearings. To ensure such correct assembly of thrust washers requires appreciable care to be taken if the assembly is being performed manually, or introduces additional complexity if the assembly is being carried out by automatic machinery.

Accordingly it is the object of the present invention to provide a thrust washer which reduces the above described disadvantages of hitherto conventional thrust washers, by being capable of carrying out the above described functions whichever way it is placed in the bearing cup.

According to the invention, we provide a thrust washer having opposed faces for a bearing assembly of a Hookes universal joint of the type specified, comprising a central portion having opposed faces for engagement with the end surface of the journal and a peripheral portion having opposed faces for engagement with ends of the needle roller bearings, wherein the peripheral portion of the thrust washer is of different thickness from the central portion thereof, and is connected to the central portion by means permitting the two portions to be displaced axially of the bearing assembly relative to one another.

When a thrust washer according to the invention is in position in a bearing assembly, the freedom of the central and peripheral portions of the thrust washer to move axially relative to one another enables them to assume positions such that both portions of the thrust washer can lie against the base wall of the bearing cup. Then the peripheral portion, if it is thicker than the central portion, extends sufficiently far from the bottom wall to prevent the needle roller bearings from engaging the bevelled part at the end of the journal, whilst the central portion of the thrust washer is engaged by the end surface of the journal in the usual way.

By analogy with the previous known typical form of thrust washer above described, the peripheral portion of the washer according to the invention is preferably thicker than the central portion thereof. However, the invention also is applicable if for some reason the design of the bearing assembly is such that the peripheral portion of the thrust washer is required to be thinner than the central portion thereof.

A thrust washer according to the invention is preferably an integral moulding of a plastics material, as are previously known forms of thrust washer. Preferably the central and peripheral portions are connected by circumferentially spaced, relatively thin, web portions, separated by circumferentially extending apertures.

Such web portions may be arranged to be deformed to permit the relative axial displacement of the two portions of the thrust washer. However, it would be within the scope of the invention if the nature of the material of the thrust washer were to be relatively brittle, such that it would be fractured by the relative axial displacement of the two portions of the washer. Such fracture may occur in a region or regions of weakness, e.g. webs as above referred to, or an appropriately positioned annular region of weakness.

The invention also provides a bearing assembly for a Hookes universal joint, the bearing assembly having a thrust washer according to the invention as above defined. Yet a further aspect of the invention provides a Hookes universal joint having such bearing assemblies.

The invention will now be described by way of example with reference to the accompanying drawings, of which:

Figure 1:
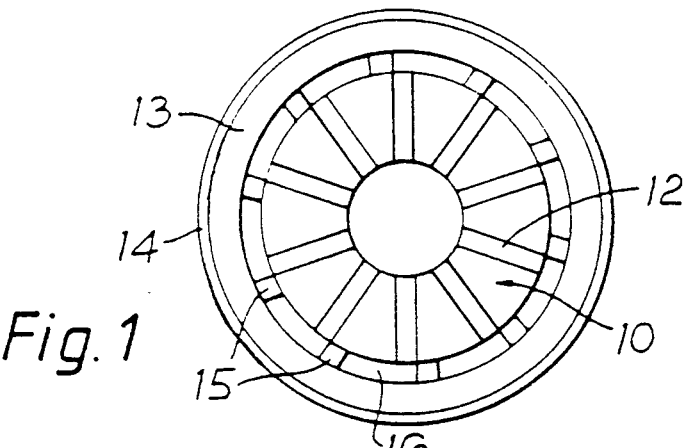
FIG. 1 is a plan view of a thrust washer according to the invention.
Figure 2:
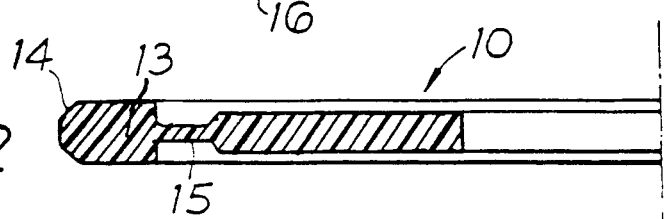
FIG. 2 is a section through part of the thrust washer.

Referring firstly to FIGS. 1 and 2, the thrust washer there illustrated is a one-piece moulding of a plastics material selected to have suitable bearing properties. By way of example, a suitable grade of nylon, possibly with a suitable filler material, may be utilised as is well known for thrust washers. The washer comprises a central portion 10 which is in the form of an annulus with a central aperture 11, having circumferentially spaced radially extending grooves 12 in its surface. The grooves 12 provide a reservoir for lubricant. The thrust washer further comprises a peripheral portion 13 which is an annulus with an outer periphery bevelled at 14, connected to the central portion 10 of the washer by a plurality of circumferentially spaced relatively thin webs 15 separated by part-annular apertures 16. The webs 15 are sufficiently thin to enable a small amount of relative movement between the central and peripheral parts of the washer in the direction of the thickness of the washer, i.e. axially of the bearing assembly in which the washer is to be used. The peripheral portion 13 is thicker than the central portion 10.

Figure 3:
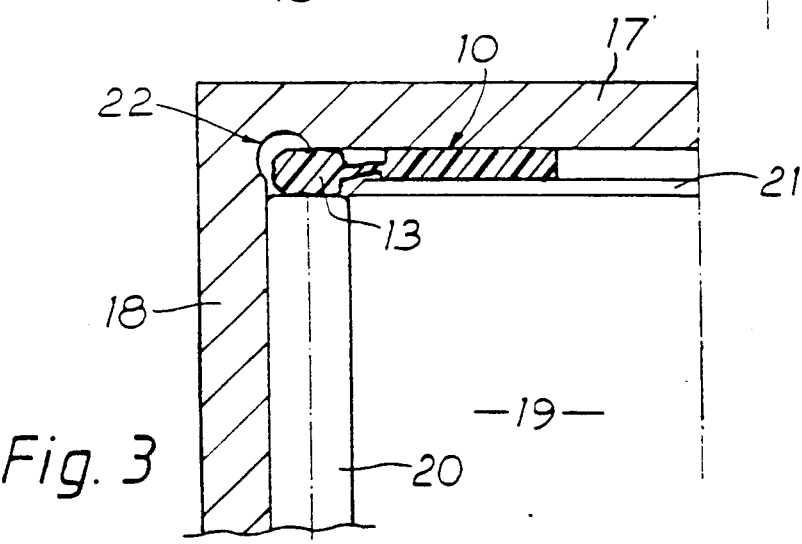
FIG. 3 is a part section through part of a bearing assembly of a Hookes joint, with the thrust washer in position.

Referring now to FIG. 3, this shows part of a bearing assembly for a Hookes joint. The assembly comprises a bearing cup with a base wall 17 and a circumferential side wall 18. The bearing cup receives a journal 19 of the joint cross member with the intermediary of needle roller bearings one of which is indicated at 20. Also visible in FIG. 3 is a frusto-conical bevelling 21 formed at the end of the journal 19 and an annular undercut 22 formed between the internal surfaces of the base and side walls of the bearing cup.

In FIG. 3, the thrust washer is shown in the condition it assumes in use. By deformation of webs 15, the peripheral portion 13 of the thrust washer has become displaced relative to the central portion 10 thereof, so that both portions can lie against the flat internal surface of the bottom wall 17 of the bearing cup. The central portion 10 of the thrust washer accommodates axial forces arising between the journal and bearing cup, whilst the peripheral portion 13 engages the ends of the needle roller bearings 20 and extends sufficiently far from the base wall 17 of the bearing cup to ensure that they do not come in contact with the bevelling 21 on the journal.

Figure 4:
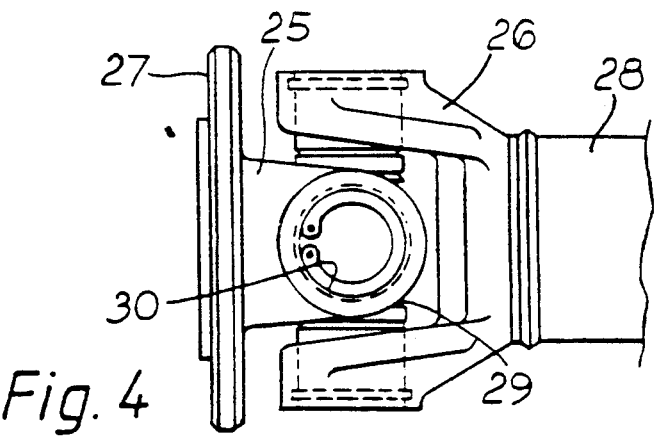
FIG. 4 is an elevation of a Hookes joint which may have bearing assemblies as shown in FIG. 3.

FIG. 4 shows an example of a Hookes joint which advantageously may have bearing assemblies fitted with thrust washers as above described. The joint comprises a first yoke 25 and a second yoke 26, the former being provided with a flange 27 for bolted connection to a rotary element and the latter being welded to a shaft part 28. The yokes 25, 26 are joined by a cross-member 29 whose journals are supported in bearing assemblies held by the yoke members. Visible in FIG. 4 is a circlip 30 by which the bearing cup is held in the respective limb of yoke 25, the circlip engaging the base wall of the bearing cup.

It would be within the scope of the invention if the material of the thrust washer were to be brittle, so that the webs 15 fracture rather than deform as the peripheral portion of the washer displaces relative to the central portion thereof.

I claim:

1. A thrust washer having opposing faces, for a bearing assembly of a Hookes universal joint comprising a central portion (10) for engagement with an end surface of a said joint journal and a peripheral portion (13) for engagement with ends of a said joint needle roller bearings, with the central and peripheral portion (10,13) thereof connected by circumferentially spaced web portions (15) separated by circumferentially extending apertures (16), wherein the peripheral portion of the thrust washer (13) is of different thickness from the central portion (10) thereof, and is connected to the central portion by means (15) permitting the two portions (10,13) to be displaced axially of the bearing assembly relative to one another and to assume functional positions whichever face of the central portion engages the end surface of the journal.

2. A thrust washer according to claim 1 comprising an integral moulding of a plastic material.

3. A thrust washer according to claim 1 wherein said web portions (15) are arranged to be deformed by said relative axial displacement of the two portions of the washer.

4. A thrust washer according to claim 1 or 3 wherein the peripheral portion (13) is thicker than the central portion (10) thereof.

5. A thrust washer according to claim 1 wherein each face of the thrust washer is adapted to separately cooperate with the bearing cup base wall and the other face is separately adapted to cooperate jointly with the end surface of the journal and the roller bearings while the opposite face cooperates with the bearing cup base wall.

6. A thrust washer for use in a bearing assembly of a Hookes universal joint comprising two yokes and a cross member having journals supported in the yokes by respective bearing assemblies; each bearing assembly comprising a bearing cup having a circumferential wall and a base wall, a plurality of needle roller bearings disposed around the interior of the circumferential wall of the bearing cup, and a thrust washer having opposed faces and disposed within the bearing cup with one face engaging the base wall thereof, the thrust washer comprising a peripheral portion whose other face engages the ends of the needle roller bearings, a central portion whose other face is engagable with an end surface of the journal, and means connecting the peripheral portion to the central portion; wherein both faces of the thrust washer alternatively are cooperable with the bearing cup base wall and with the rollers and end surface of the journal, the peripheral portion of the thrust washer being of greater thickness than the central portion thereof and the means connecting the peripheral and central portions permitting the two portions to be displaced axially of the bearing assembly relative to one another upon assembly so that said portions are able to assume functional positions whichever face of the central portion engages the end surface of the journal.

7. A thrust washer according to claim 6 wherein said central portion, peripheral portion and means connecting said portions are integral with one another and are of a plastic material.

8. A thrust washer according to claim 7 wherein said means connecting the central and peripheral portions thereof comprises circumferentially spaced web portions separated by circumferentially extending apertures.

9. A thrust washer according to claim 8 wherein said web portions are deformable by said relative axial displacement of the central and peripheral portions of the washer.

10. A thrust washer according to claim 6 wherein said means connecting the central and peripheral portions thereof comprises circumferentially spaced web portions separated by circumferentially extending apertures.

11. A thrust washer according to claim 10 wherein said web portions are deformable by said relative axial displacement of the central and peripheral portions of the washer.

12. A bearing assembly for a Hookes universal joint comprising a bearing cup having a circumferential wall (18) and a base wall (17); a plurality of needle roller bearings (20) disposed within the circumferential wall (18) of the bearing cup; and a thrust washer within the bearing cup at the base wall (17) thereof and a thrust washer having opposed faces and disposed within the bearing cup with one face engaging the base wall thereof, the thrust washer comprising a peripheral portion whose other face engages the ends of the needle roller bearings, a central portion whose other face is engagable with an end surface of a said universal joint journal, and at least one web connecting the peripheral portion to the central portion; wherein both faces of the thrust washer alternatively are cooperable with the bearing cup base wall and with the rollers and end surface of the journal, one of the peripheral portion and the central portion of the thrust washer being of greater thickness than the other of the peripheral and central portions thereof and the at least one web connecting the peripheral and central portions being thinner than both said portions and permitting the two portions to be displaced axially of the bearing assembly relative to one another upon assembly so that said portions are able to assume functional positions whichever face of the central portion engages the end surface of the journal.

13. A bearing assembly according to claim 12 wherein said thrust washer central portion, peripheral portion and means connecting said portions are integral with one another and are of a plastic material.

14. A bearing assembly according to claim 13 wherein said means connecting the central and peripheral portions thereof comprises circumferentially spaced web portions separated by circumferentially extending apertures.

15. A bearing assembly according to claim 14 wherein said web portions are deformable by said relative axial displacement of the central and peripheral portions of the washer.

16. A bearing assembly according to claim 12 wherein said means connecting the central and peripheral portions thereof comprises circumferentially spaced web portions separated by circumferentially extending apertures.

17. A bearing assembly according to claim 16 wherein said web portions are deformable by said relative axial displacement of the central and peripheral portions of the washer.

18. A bearing assembly according to claim 12 wherein the peripheral portion is thicker than the central portion thereof.

19. A Hookes universal joint comprising two yokes (25,26) joined by a cross member (29) having journals (19) supported in the yokes by bearing assemblies each comprising a bearing cup having a circumferential wall (18) and a base wall (17); a plurality of needle roller bearings (20) disposed within the circumferential wall (18) of the bearing cup; and a thrust washer within the bearing cup at the base wall (17) thereof, the thrust washer having opposed faces and disposed within the bearing cup with one face engaging the base wall thereof, the thrust washer comprising a peripheral portion whose other face engages the ends of the needle roller bearings, a central portion whose other face is engagable with an end surface of the journal, and at least one web connecting the peripheral portion to the central portion; wherein both faces of the thrust washer alternatively are cooperable with the bearing cup base wall and with the rollers and end surface of the journal, one of the peripheral portion and the central portion of the thrust washer being of greater thickness than the other of the peripheral and central portions thereof and the at least one web connecting the peripheral and central portions being thinner than both said portions and permitting the two portions to be displaced axially of the bearing assembly relative to one another upon assembly so that said portions are able to assume functional positions whichever face of the central portion engages the end surface of the journal.

20. A Hookes universal joint according to claim 19 wherein said central portion, peripheral portion and means connecting said portions are integral with one another and are of a plastic material.

21. A Hookes universal joint according to claim 20 wherein said means connecting the central and peripheral portions thereof comprises circumferentially spaced web portions separated by circumferentially extending apertures.

22. A Hookes universal joint according to claim 21 wherein said web portions are deformable by said relative axial displacement of the central and peripheral portions of the washer.

23. A Hookes universal joint according to claim 19 wherein said means connecting the central and peripheral portions thereof comprises circumferentially spaced web portions separated by circumferentially extending apertures.

24. A Hookes universal joint according to claim 23 wherein said web portions are deformable by said relative axial displacement of the central and peripheral portions of the washer.

25. A Hookes universal joint according to claim 19 wherein the peripheral portion is thicker than the central portion thereof.

* * * * *